June 13, 1967     W. A. BARY     3,325,124
CLOSED TRACK AIRPORT WITH INLET RUNWAYS
FOR STRAIGHT INSTRUMENT LANDINGS
Filed Feb. 24, 1966     3 Sheets-Sheet 1

INVENTOR
Waldemar A. Bary
BY
ATTORNEYS.

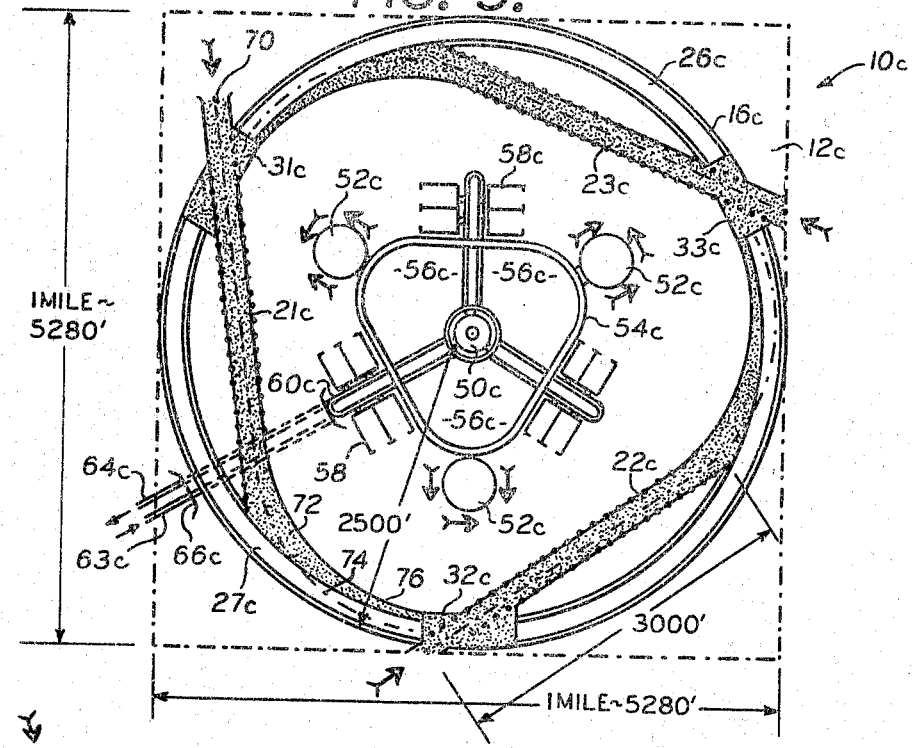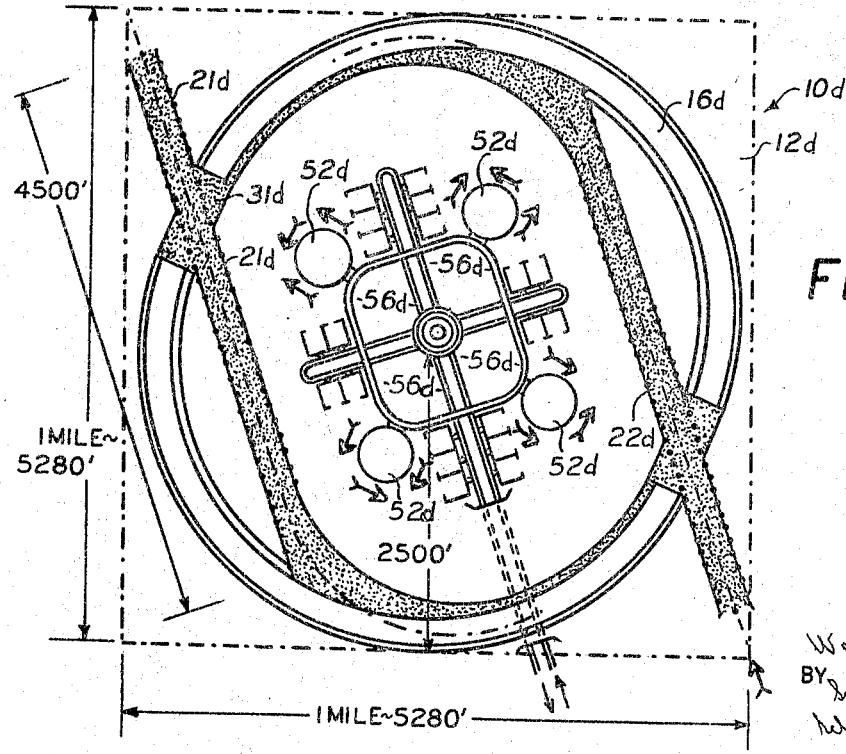

United States Patent Office 3,325,124
Patented June 13, 1967

3,325,124
CLOSED TRACK AIRPORT WITH INLET RUNWAYS FOR STRAIGHT INSTRUMENT LANDINGS
Woldemar A. Bary, Willow Brook House, R.D. 1, East Stroudsburg, Pa. 18301
Filed Feb. 24, 1966, Ser. No. 529,759
11 Claims. (Cl. 244—114)

This invention relates to curved runway airports, especially to closed track airports.

The closed track airport provides three important advantages. One is that the length of the runway is infinite, and in the event that an engine fails to deliver adequate power for takeoff, there is no posibility of running beyond the end of the runway. Likewise, upon landing, and especially in bad weather, failure to touch down near the entrance end of the strip does not reduce the available remaining length of strip for deceleration.

Another advantage is that because of the greater distance available for the takeoff run it can be made steeper and for a higher speed, and engines need not be operated at full output, and both engine wear and noise are reduced. Also, the closed track greatly reduces the land area required for the airport and makes it possible to locate an airport of adequate size closer to the town which is to be served.

A closed track airport is the result of coiling a conventional, straight runway of limited length into an endless ring track with such substantial saving in acreage that a track of approximately 15,000 feet in circumference needs less than 1,000 acres of land.

When a closed track airport has to be used by very large, heavily loaded aircraft of high landing speed, and especially where blind instrument landings are to be made, the aircraft must follow a straight radar course during approach and must land without any banking. Bary Patent No. 3,173,634 (issued Mar. 16, 1965), for "Closed Track Airport," discloses a completely circular runway. In order better to adapt the airport of that patent for straight course landings, an improved closed track airport was provided in my co-pending application Serial No. 490,241 (filed Sept. 27, 1965), for a "Closed Track Airport with Straight Runways for Instrument Landing and Takeoff."

This co-pending application, Ser. No. 490,241, has straight and level runways inside the ring and extending as chords of the circular track. Such chordal tracks provide straight landing strips but are necessarily limited in length and they can not enter the circular portion of the runway with the ideal tangential flow. Also the angle of approach to the chordal tracks is limited by the height of the banked runway of the closed track.

It is an object of the present invention to provide a closed track airport with longer straight approach runways leading into the closed track from the outside and generally tangent to the curved track so as to use the endless banked track for deceleration without having to fly an approaching aircraft over the obstruction created by the bank of the curved portion of the runway. The present invention is a closed track airport with one or more straight and level runways tangent to the closed track runway and with safety, compactness of operation, and a minimum of acreage to be maintained.

Although it is necessary to have a curved track banked to a superelevation of substantial height for aircraft that land at high speed, the present invention provides one or more substantially straight portions in the closed track where there is no banking necessary and where a substantially straight and tangential approach track leads into the closed track from the outside at a region where both the approach track and the closed track are level. The straight runways can be as long as necessary for instrument landing touchdowns with an ample factor of safety as to position along the approach track, and the aircraft can land at a closed track airport with no more risk of striking a banked portion of the closed track than there is of striking a hangar or other building of the airport complex.

With the present invention, an aircraft comes from a straight and transversely level runway into a curved and banked runway around which the aircraft rolls as it slows down to the speed at which it will taxi to the passenger or freight discharge location. This feature for reducing the length of the runway can also be used without a completely closed airport, if desired, to reduce the necessary area of the airport; but the invention is intended for closed track airports and will be described in connection with such airports having various numbers of approach runways.

Other objects, features and advantages of the invention will appear or be pointed out as the description proceeds.

In the drawing, forming a part hereof, in which like reference characters indicate corresponding parts in all the views:

FIGURES 5 and 6 are views similar to FIGURE 1 but showing modified forms of the airport of this invention.

Figure 1:
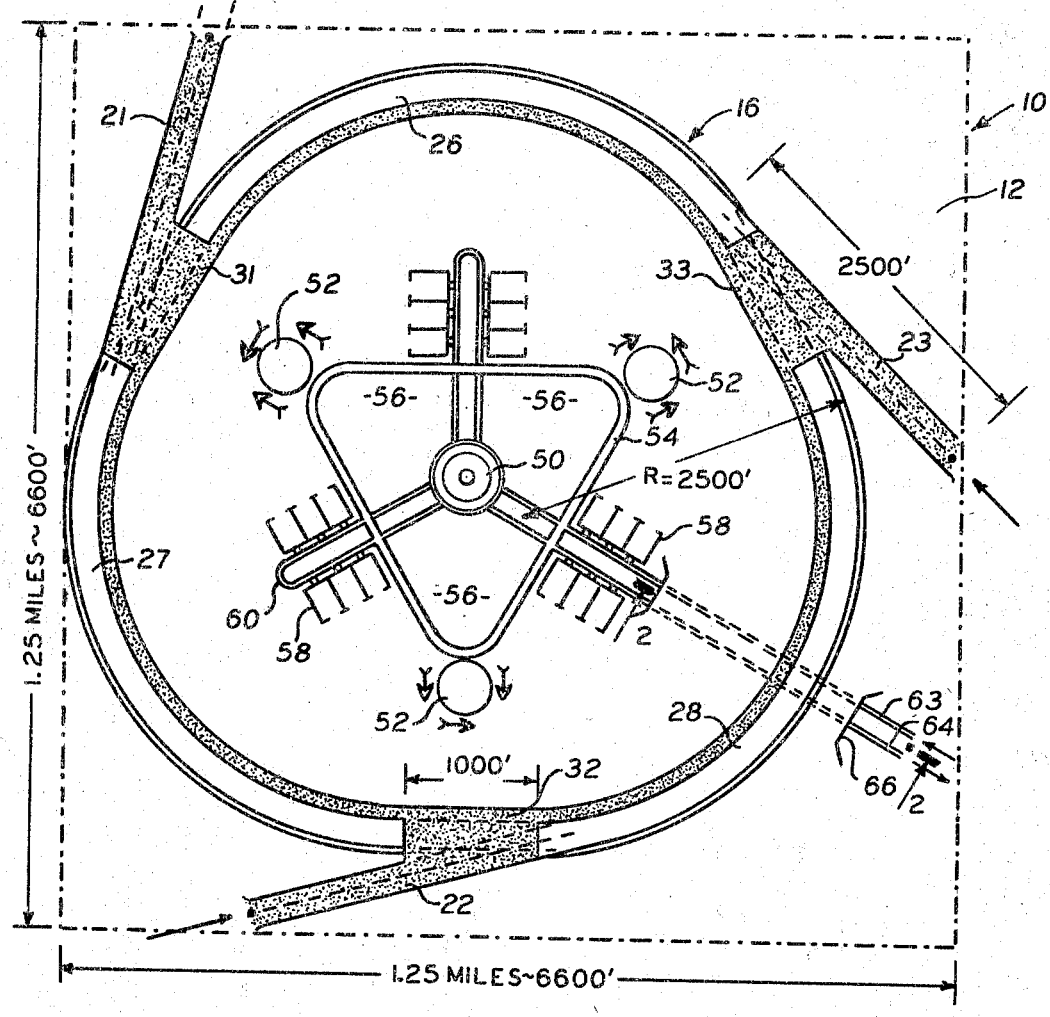
FIGURE 1 is a diagrammatic plan view of a closed track airport, made in accordance with this invention, having three tangential runways and located within an area 1.25 miles square.

Level paved parts of the tracks are stippled in the drawing.

FIGURE 1 shows an airport 10 located on a land tract 12 which is outlined in dot-and-dash lines. This land tract is square and each side has a length of 1.25 miles. Although the illustration gives dimensions in order to emphasize the saving in land area which is possible without sacrifice of runway lengths, it will be understood that all dimensions described herein are given merely by way of illustration and that the actual dimensions used depend upon the service for which the airport is intended.

The airport 10 has a curved runway 16 consisting of a closed track with three tangential runways 21, 22 and 23. The closed track has three curved sections 26, 27 and 28. The curved sections are joined together by straight sections including a straight section 31 which joins the curved sections 26 and 27 to one another; a straight section 32 which joins the curved sections 27 and 28 to one another; and a straight section 33 which joins the curved sections 28 and 26 to one another.

The curved sections 26, 27 and 28 are banked to a progressively higher angle toward their outer edges and in accordance with highway engineering practice, as will be explained in connection with FIGURE 2. The straight sections 31, 32 and 33 are transversely level and these straight sections join the curved sections at regions of progressively increasing or decreasing radius of curvature so that the transverse slop or bank of the track changes progressively along its length in accordance with conventional engineering practice. For example, in the drawing, the curved sections 26, 27 and 28 are shown as circular arcs around most of the length of these sections and the merging of straight tracks into curves is well known in the construction of railroads and highways so that no expanation of it is necessary for a complete understanding of this invention.

Since the straight sections 31, 32 and 33 are transversely flat, the tangential runways 21, 22 and 23, respectively, can enter the closed track at these straight sections without passing over any banked rim of the curved runway. Each of the tangential runways, where it joins a straight section of the closed track, is preferably in the same plane with the straight section with which it merges. The approach runways 21, 22 and 23 are generally tangent to the curved portion of the closed track which is located just beyond the straight section 31, 32 or 33, with which the tangential runway merges but in practical application of these approach runways to the closed track, variations in the angle of approach can be made to suit local conditions so long as a generally tangential relation is maintained.

For the airport shown in FIGURE 1, the straight sections 31, 32 and 33 are each 1,000 feet in length, and beyond this length they begin a progressively increasing transition curvature and merge with the preferably constant curvature that the curved sections 26, 27 and 28 have along most of their length. In the illustrated construction, the curved sections 26, 27 and 28 have a radius of 2,500 feet. The tangential approach runways provide approximately 2,500 feet of level runway before the region of merger of the tangential runways with the closed track acquires a substantial curvature and bank. Thus an aircraft landing on one of the approach runways has considerable distance in which to reduce its speed before changing from a straight to a circular course, though the change can be made at maximum speed where an aircraft touches down near the closed track end of an approach runway because the change from straight to curved runway is gradual and the maximum bank of the curved runway is sufficient to compensate the centrifugal forces acting on the aircraft at maximum speed.

Figure 2:
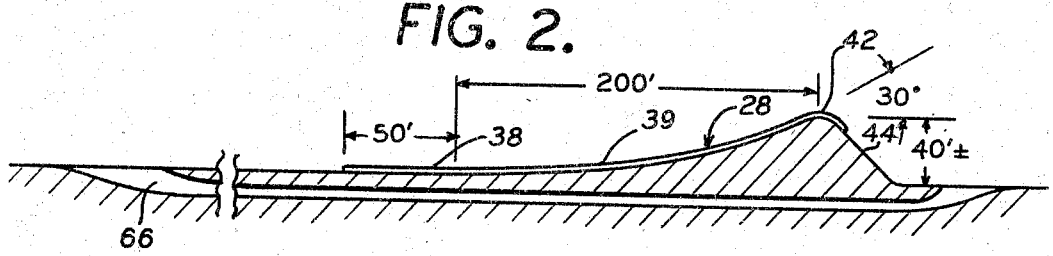
FIGURE 2 is an enlarged sectional view, partly broken away, taken on the line 2—2 of FIGURE 1.

The cross section and progressively increasing transverse slope of the curved section 28 is shown in FIGURE 2. The other curved sections are of similar construction. In the construction illustrated, the curved section 28 has an inner level area 38 which has a radial width of approximately 50 feet. Beyond this area 38, the runway has a banked area 39 with the angle of bank increasing progressively from zero to 30° in a transverse width of approximately 200 feet. As in the case of other dimensions specified herein, these dimensions are merely by way of illustration; and the proportions are also illustrative. For example, although the curved section 28 is banked across most of its width, the banked section may be greater or lesser in proportion, as compared to the level area 38, than the ratio illustrated in FIGURE 2.

After an aircraft has touched down on any of the runways, its further travel is that of a land vehicle and the steepness of banking and the radius of the circular track confrom to the regular practice of modern highway construction. For example, the superelevation for the curved section 28 with a radius of 2,500 feet and for a maximum rolling speed of 140 miles per hour, is .175 feet for each foot of the track's upgraded width. This is based on formulae and table data found in such manuals as the "Transition Curves for Highways" by Joseph Barnett, P.R.A., and "Concrete Pavement Manual" of the Portland Cement Association. At such a superelevation of .175, a Boeing 707, with a wing span of about 130 feet, will have at all times and at any point of the track, a wing tip clearance to the ground of a minimum of six feet, a comfortable margin for the pilot. The concave curvature of the banked track in a radial and vertical plane, must provide ample wing tip clearance for all aircraft with which the airport is intended to be used.

The official manual "Transition Curves for Highways" by Joseph Barnett, Bureau of Public Roads, Department of Agriculture, provides for highway designs with "safe speed on curves" the following equation:

$$S = 0.067 \frac{V^2}{R} - F$$

where:
$S$=superelevation in feet per foot of upgrading
$V$=speed in m.p.h. (¾ of landing speed=105 m.p.h.)
$R$=radius of track curve in feet (2,500 feet)
$F$=side friction coefficient (0.12)

$$S = 0.067 \frac{105 \times 105}{2,500} - 0.12 = .175$$

Thus, for a 200-feet wide banked track, the height of its outer rolling zone is:

$$200 \times 0.175 = 35 \text{ feet}$$

with a wall height at the hump of not over 40 feet.

The U.S. Navy, for its "Mesa Arizona Tests," according to the "Landing on a Round Runway," Naval Aviation News, March 1965, has used the following equation:

$$\operatorname{Tan} \phi = \frac{V}{g \cdot R}$$

where:
$\phi$=the angle of bank
$V$=ground speed of aircraft (140 m.p.h)
$g$=gravity constant (32.740 feet sec.²)
$R$=radius of turn (2,500 feet)

$$\operatorname{Tan} \phi = \frac{140 \times 5280}{60 \times 60} \times \frac{140 \times 5280}{60 \times 60} \frac{1}{32.740 \times 2500} = 0.5241$$

Thus the banking angle is: 27° 40′.

The transition part of the track between its circular and straight sections has to be also built in accordance with specific regulations prescribed by the "Highway Manual" of the Bureau of Public Roads.

Furthermore, a banked track of 200 feet in width with a superelevation of 0.175 will provide the 130 feet span Boeing 707 with a comfortable six feet clearance between its wing tips and ground.

The landing is made with a straight approach and the touchdown on a straight, wide, level and long-enough runway, and only thereafter the plane has to roll on a curved and properly banked path, then such a landing is perfectly safe and practical, and the straight radar beam at the approach can be used. This, of course, provided that the track answers the above-prescribed official highway regulations of the Bureau of Public Roads, since the plane on the curved track has now become a ground vehicle.

The airport illustrated has a height around the outer circumference of the curved section 28 of approximately forty feet above the plane of the area 38. Usually this area 38 will be at the same level as the entire center area of the airport neclosed within the curved runway or closed track 16. In the illustrated construction, the track is paved across the entire areas 38 and 39, and preferably for a short distance beyond the top 42 of the hump formed by the bank of the outside of the track. Beyond the top 42 of the hump, the ground slopes downward along a slope 44 at a safe angle of repose.

Aircraft landing at the airport shown in FIGURE 1 can land on any one of the tangential runways 21, 22 and 23 and their choice dictated by the wind direction or by other considerations. For a closed track airport, wind is less a consideration than with conventional airports because it is not necessary to land into the wind in order to reduce the resulting run on the ground, there being ample distance beyond the point of touchdown. Also wind direction is less of a factor with modern aircraft having heavier wind loadings. For takeoff, the run is made along a curved section and an aircraft can take off, when sufficient speed is attained, from either a curved section or from one of the straight sections. Since takeoff is not made with instruments, long straight runways are unnecessary. Since the takeoff is made from the closed track, it is always possible to take off into the wind, if desired.

Within the area surrounded by the closed track, the airport has a control tower 50 and a plurality of debarkation pavilions 52, shown at angularly spaced locations around the center of the field. These pavilions 52 are connected by a roadway 54 and there are parking areas 56 located across from each pavilion 52 and within the area surrounded by the roadway 54. Hangers 58 are located along connecting roadways 60, and the roadway system connects with the area outside of the airport along roads 63 and 64 extending through a tunnel 66 that passes under the closed track.

This building, road, and parking lot complex, dividing the facilities into three groups, reduces congestion of operation as compared with airports where numerous airlines operate from one pavilion. It also greatly reduces thed istance which planes are required to taxi to reach the airstrip. The management is still from the single control tower 50 which is the top of of an administration building.

Figure 3:
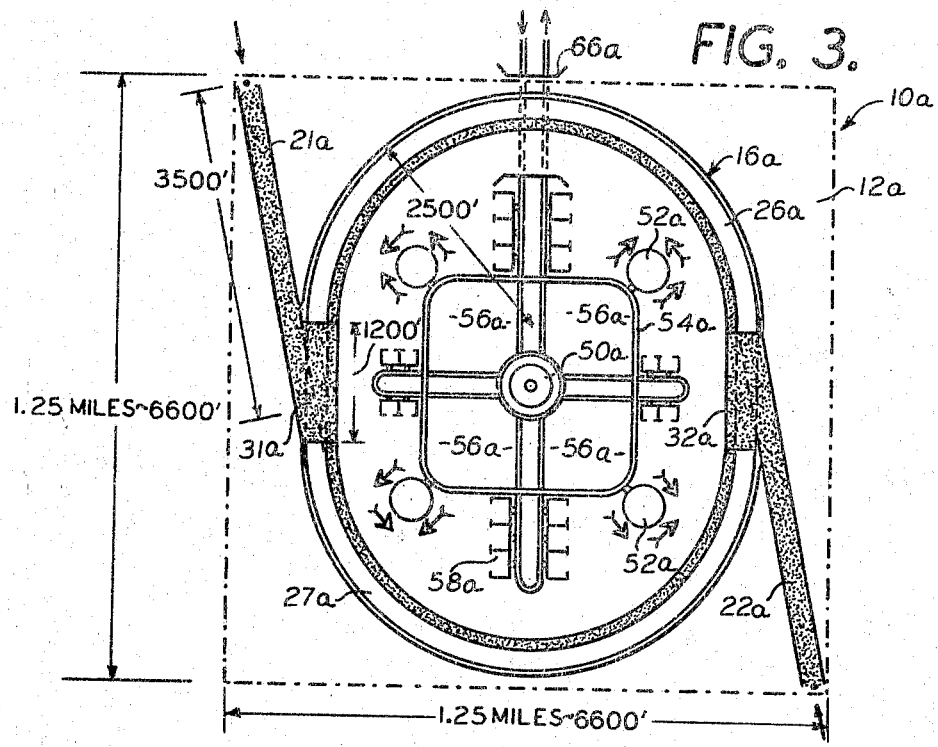
FIGURE 3 is a view similar to FIGURE 1 but showing an airport having two tangential runways.

FIGURE 3 shows another airport 10a. This airport is located on a land tract 12a which is of the same size as that shown in FIGURE 1. All of the corresponding parts of the airport 10a are indicated by the same reference characters as in FIGURE 1 but with a letter "a" following the reference character.

The curved runway or curved track 16a, shown in FIGURE 3, has only two straight sections 31a and 32a, instead of the three sections shown in FIGURE 1. These straight sections are preferably at opposite sides of the airport and curved sections 26a, which connect the straight sections, are of substantially 180° in extent, though with the same merging curvatures as described in connection with FIGURE 1.

Tangential approach runways 21a and 22a are substantially longer in FIGURE 3 than in FIGURE 1 because the different shape of the closed track makes this possible within the same land area. It will be evident that the airport of FIGURE 3 could actualy be placed on a substantially smaller land area, with the same length approach runways, than the airport of FIGURE 1.

FIGURE 3, with only two approach runways, is a varient of the embodiment of the invention shown in FIGURE 1. By providing two approach runways, it is never necessary for an aircraft to land directly downwind.

Another advantage of the airport shown in FIGURE 3 is that the length of curved runway along which a landing aircraft travels after entering the closed track is substantially longer before reaching another straight section of the closed track. This makes it possible for most aircraft to come to taxiing speed before having to shift from one regimen to another.

Figure 4:
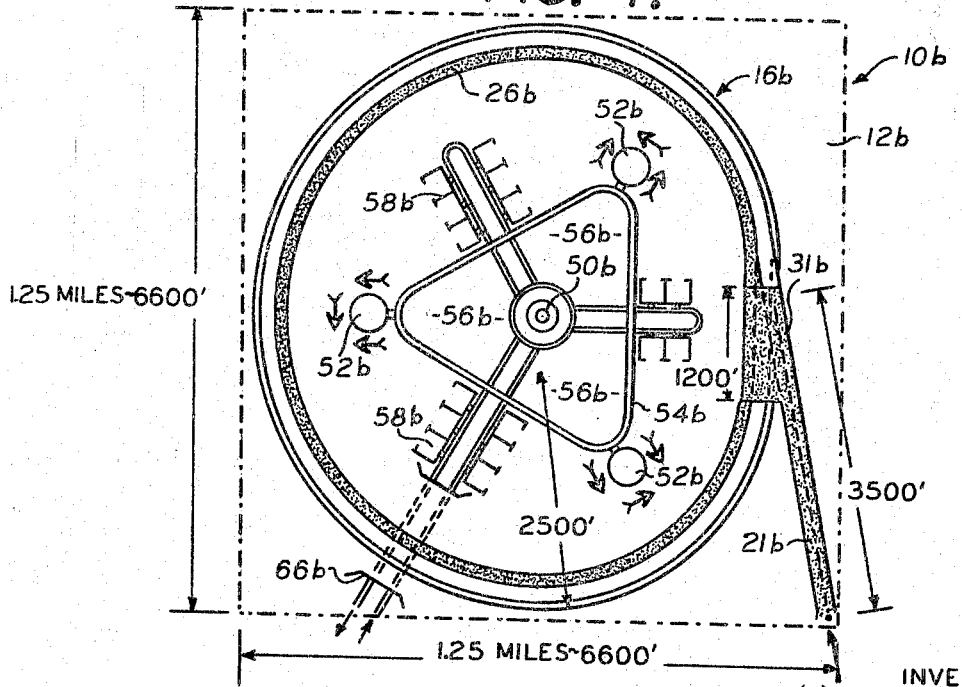
FIGURE 4 is a view similar to FIGURES 1 and 3 but showing an airport having only one tangential runway.

FIGURE 4 shows another airport 10b located on an area 12b which is the same size as the land areas of the airports shown in FIGURES 1 and 3. This airport 10b has only one approach runway 21b, and except for the shape of the closed track, is generally similar to the airport shown in FIGURE 3. However, the different shape of the track makes desirable a different arrangement of the pavilion and hangar complex for the airport 10b and corresponding elements of the airport are indicated by the same reference character as in FIGURE 1 but with a letter "b" following the reference character.

FIGURE 5 shows another modification of the invention in which corresponding parts of the airport are indicated by the same reference characters as in FIGURE 1 with a letter "c" added to the reference character. This modified airport 10c is on a land tract 12c which is substantially smaller than the land tract of the airports shown in FIGURES 1, 3 and 4; but the modified construction of FIGURE 5 makes it possible to have the straight runways even longer than in FIGURE 1. The acreage required for the airport of FIGURE 5 is 640, compared with 1,000 for the airports in FIGURES 1, 3 and 4. These values are given merely by way of illustration for straight runways of the length indicated in the various figures of the drawing.

FIGURE 5 has a closed track 16c combined with three straight runways 21c, 22c and 23c. Instead of having these straight runways located outside of the closed track, as in the airports shown in FIGURES 1, 3 and 4, the straight runways of FIGURE 5 start outside the closed track 16c and cross the closed track to continue as straight chordal runways within the closed track.

For example, the straight runway 21c starts at a location 70 outside of the closed track and crosses a straight level portion 31c of the closed track but at a different angle than the runway 21 of FIGURE 1. Instead of being tangent, or substantially tangent, to the closed track, the runway 21c is at such an angle that it forms a chord subtending a substantial length of the curved portion of the closed track beyond the level section 31c; and the straight runway 21c then merges with the curved section 27c at the region 72.

The level portions of the closed track 16c and of the straight runways 21c, 22c and 23c are stippled in FIGURE 5. A path which may be followed by an aircraft is indicated by the reference character 74. It will be apparent that the aircraft follows a straight course in descending and during its roll along the straight section 21c; then the aircraft turns as it comes into the arcuate section 27c and rolls obliquely up the bank of the curved section 27c to a course corresponding to the speed of the plane. It is one of the advantages of the longer straight runway that the aircraft slows down to a lower speed before changing from a straight to a curved path.

As will be observed from the stippling in FIGURE 5, there is a portion of each curved section of the closed track beyond the chordal runways and the next flat section of the closed track. Although there is a similar flat portion along all other parts of the curved sections, for example the area 76, these areas are preferably not paved since there is little likelihood of their being used. Ordinarily, a plane going off the closed track 16c for the purpose of taxiing to a pavilion or hanger, will leave the track from one of the chordal runways or from the level portion of the curved sections between the chordal runways.

Because of the sharper angle which the straight runways 21c, 22c and 23c make with the level sections 31c, 32c and 33c, respectively, it is possible to use shorter straight sections 31c, 32c and 33c and still obtain the same clearance for the banked portions of the closed track on each side of the straight approach runways; or if straight sections of the curved track of the same length as in FIGURE 1 are used, then the sharper angle of the straight runways makes possible the provision of substantially greater clearances on both sides of the straight runways before the ground rises for the banked portions of the closed track.

The use of longer straight runways has the safety feature of making the point of touchdown less important; and it also has the advantage of permitting the plane speed to be so substantially reduced that there is ample margin for a soft switch from a straight path to a curved path at the region of juncture of the straight runway with the curved sections of the closed track.

Planes taking off from the airport 10c of FIGURE 5 preferably take off from the closed track and they can always take off into the wind since there is some location around the closed track at which the aircraft heads directly into the wind.

FIGURE 6 shows a modification of the airport of FIGURE 5. Corresponding parts of the airport in FIGURE 6 are indicated by the same reference characters as in FIGURE 5 but with a letter "d," in place of the letter "c," for each reference character.

The airport 10d is on a land tract 12d which is of the same area as the airport of FIGURE 5. Because of the use of only two straight runways 21d and 22d in FIGURE 6, the shape of the closed track 16d is somewhat different from FIGURE 5 and the straight runways are differently located so that they can be substantially longer. The straight runways 21d and 22d are shown starting from somewhat further outside of the closed track 16d and most of their additional length is obtained by this extra outside length.

The complex of pavilions, hangars, roads and parking spaces for the airport 10d is slightly different from that of FIGURE 5 and more nearly resembles the assembly shown in FIGURE 3.

The preferred embodiment and four modifications of the invention have been illustrated and described but changes and other modifications can be made without departing from the invention as defined in the claims.

What is claimed is:

1. An airport including a curved runway having a surface banked upward towards the radial outer limit thereof to a substantial super elevation above a plane of the airport, a transversely level approach runway for instrument landings, said approach runway being substantially straight and leading into the curved runway from a substantially flat surface and at a region of merger with progressive change in runway surface from transversely level to the bank of said curved runway.

2. A closed track airport including a curved runway banked to progressively higher angles towards its outside limit, the curved runway having a portion of its length substantially straight transversely level approach and unbanked, and a straight runway for instrument landings connected at one end with the curved runway and merging with the curved runway at an unbanked location on the closed track.

3. The closed track airport described in claim 2 characterized by the straight runway being generally tangent to the closed track, and the curved runway having a progressively decreasing radius of curvature beyond its region of merger with the tangential runway.

4. The closed track airport described in claim 3 characterized by the curved runway having a progressively increasing radius of curvature where it approaches its straight portion.

5. The closed track airport described in claim 3 characterized by the curved runway having a substantially constant radius of curvature beyond regions where it approaches its substantially straight portion.

6. The closed track airport described in claim 5 characterized by the curved runway having only one substantially straight portion.

7. The closed track airport described in claim 2 characterized by the curved runway having a plurality of substantially straight portions at different angular positions around the curved runway and having a generally straight runway intersecting the curved runway at each of said straight portions.

8. The closed track airport described in claim 7 characterized by the straight portion of the curved runway being at substantially equal angular spacing around said curved runway.

9. The closed track airport described in claim 2 characterized by the straight runway starting outside of the closed track, extending across the straight portion of the closed track at an acute angle, and then extending as a chord subtending a length of the curved portion of the closed track, and the inner end of said straight runway merging with said length of the curved portion at the inside edge of the closed track.

10. The closed track airport described in claim 9 characterized by an airport operation complex enclosed within an area bounded by the chordal portion of the straight runway and portions of the closed track beyond both ends of said chordal portion, the operation complex including a control tower, a passenger pavilion, hangars, and a parking lot, all connected by a road, and a tunnel under the closed track and through which the road passes.

11. The closed track airport described in claim 10 characterized by the airport having a plurality of similar straight runways at angularly spaced locations around the closed track, the control tower being centrally located and there being a plurality of passenger pavilions and hangars with a parking lot adjacent to each pavilion.

References Cited

UNITED STATES PATENTS 3,157,374   11/1964   Corney _____ 244—110

DUANE A. REGER, *Primary Examiner.*

P. E. SAUBERER, *Assistant Examiner.*